United States Patent Office 3,749,592
Patented July 31, 1973

3,749,592
RADIATION CURING LACQUERS
Joseph E. Gaske, Mount Prospect, and Robert E. Ansel, Hoffmann Estates, Ill., assignors to De Soto, Inc., Des Plaines, Ill
No Drawing. Filed Mar. 25, 1971, Ser. No. 128,185
Int. Cl. B44d 1/50
U.S. Cl. 117—62
13 Claims

ABSTRACT OF THE DISCLOSURE

A substrate is coated with a lacquer in which a normally solid radiation curable resin system is dissolved in an organic solvent. After the solvent has evaporated, the deposited film is physically worked and then irradiated to increase the solvent resistance and physical toughness of the film.

The present invention relates to the application of radiation curable lacquers on substrates so that the lacquer coating can be deposited in the form of an easily workable solid film in solvent soluble thermoplastic form and then physically worked for various purposes which are conventional to the lacquer art, whereafter the film modified by the physical working can be exposed to radiation in order to cure the same, e.g., to increase the solvent resistance and physical toughness of the film and thereby produce a more durable film which is difficult to work.

Considering the invention from the standpoint of its most prominant utility which is the finishing of wooden furniture, it is common in the wood finishing art to coat prefinished wood after it has been appropriately prepared as by sanding, staining, filling, and sealing, with a clear finish commonly termed a lacquer. The lacquer film so-deposited is solvent sensitive and easily scratched which limits the utility of the lacquered product. On the other hand, these conventional lacquers are easily handled and can be repaired, rubbed or buffed in order that the finished furniture will possess the perfection finish which is required for saleability.

The art has attempted to employ lacquers which would deposit solvent resistant and physically tough films, but these more durable finishes were poorly adapted to be repaired, rubbed or buffed and the perfection finish required for saleability was difficult to provide.

In the present invention, the lacquer film initially applied is a solvent soluble thermoplastic film which can be easily repaired, rubbed or buffed in conventional fashion to provide the perfection finish which is desired, just as though the conventional lacquers had been used. Then, after the lacquer film is exactly in the final form which is desired, the film is irradiated and quickly converted to the solvent resistant and physically tough form which is preferred for enhanced durability.

In the present invention, the substrate is coated with a solution which comprises an organic solvent having dissolved therein a normally solid radiation curable resin system. The solvent is then evaporated to form a solvent-soluble thermoplastic resinous film on the substrate. This film is then physically worked to repair, rub, or buff the same (sanding of the film is frequently a requisite step in the finishing operation) and the physical modification of the film is followed by irradiation to increase the solvent resistance and physical toughness of the film.

The normally solid radiation curable resin systems which are preferred comprise the addition reaction product of an hydroxy functional lacquer grade resin and an ethylenically unsaturated monoisocyanate. The radiation which is used is desirably selected from ionizing radiation such as gamma radiation or beta radiation, and ultra-violet light radiation, the latter being particularly preferred. In order to employ ultraviolet light radiation, it is normally necessary to include in the radiation active resin system a sensitizer to render the resinous reaction product sensitive to ultraviolet light. Such sensitizers are well known and are illustrated herein by benzophenone.

Referring more particularly to the hydroxy functional lacquer grade resins which are used in this invention, these are particularly illustrated by nitrocellulose and hydroxyethyl cellulose. Cellulose acetate butyrate is also useful. At least a portion of the hydroxy groups of the resin which is selected are reacted with an ethylenically unsaturated monoisocyanate. As is well known, the reaction between the isocyanate group and the hydroxy group proceeds at room to moderate temperature forming the urethane group, and this serves, without cross-linking, to introduce into the hydroxy functional lacquer grade resin, a plurality of ethylenic groups for subsequent cure via radiation activation. While it is desired to employ a monoisocyanate in order to avoid prematurely cross-linking the lacquer grade resin, it is not necessary that polyisocyanates be completely avoided so long as the amount of polyisocyanate present is sufficiently small to avoid gelling the lacquer grade resin.

This invention prefers to use ultraviolet radiation and, accordingly, the ethylenic unsaturation should be alpha, beta-ethylenic unsaturation as is found in acrylates, maleates, fumarates and the like.

The unsaturated monoisocyanates are conveniently formed by reacting one mol of an alpha,beta-ethylenic alcohol with one mol of a diisocyanate to form a monoisocyanate adduct. A small (2–20%) excess of the alcohol is desirable to minimize unreacted diisocyanate. Diurethanes in small amount are not harmful. Purification to extract diisocyanate as by distillation may be carried out, but is not necessary. The preferred monoethylenic alcohols used for the technique are acrylates such as hydroxy ethyl acrylate. Other functional groups can be used to graft onto such as the acid chloride group, e.g., acryloyl chloride, and the amide group, e.g., acrylamide or methylol acrylamide. While alpha,beta-ethylenic unsaturation is preferred when ultraviolet light is used for cure, when ionizing radiation is used, other ethylenic unsaturation can be used more easily, e.g., allylic unsaturation as in allyl alcohol, or cyclopentenyl unsaturation, e.g., cyclopentenyl alcohol, or norbornenyl unsaturation, e.g., norbornenyl alcohol.

Before completing the description of the hydroxy resin-unsaturated monoisocyanate resins, it is pointed out that these merely illustrate normally solid radiation curable resins which may be deposited, worked and then radiation cured in this invention. Other resins are illustrated by solid polyepoxides, e.g., diepoxides, which can be reacted in solvent medium with acrylic acid in stoichiometric amount based on epoxy functionality and then deposited, worked and radiation cured in the same manner.

While conventional radiation curing systems convert directly from the liquid form to the cured solid form, this does not permit the intermediate working step which is crucial to this invention.

As should now be evident, the resins which are utilized, from the structural standpoint, are linear normally solid thermoplastic resins which include side chains containing ethylenic unsaturation, preferably alpha, beta-unsaturation for ultraviolet cure.

Referring again to the use of ethylenically unsaturated monoisocyanate, the proportion which is used is primarily determined by the extent of subsequent cure which is desired, but in ordinary practice, at least 5% of the hydroxy groups possessed by the hydroxy functional resin should be consumed by reaction with the monoisocyanate and there is no purpose in providing any stoichiometric excess of the monoisocyanate. Ordinarily, and based on the hydroxy functionality of the resin, the monoisocyanate is employed in an amount to consume at least 25% of the hydroxy functionality available. From another standpoint, the final resin should include at least about 0.1, preferably at least 0.5 mol, of ethylenic unsaturation per 1000 grams of resin. Normally, from 0.6–1.5 mols of ethylenic unsaturation per 1000 grams of resin will provide best results and about 3 mols of unsaturation represent a practical upper limit.

The reaction with monoisocyanate noted above is conveniently carried out in organic solvent solution. Naturally, this means that the organic solvent should be selected to be isocyanate-inert and the resin which is dissolved in the solvent should be free of water, all as is conventional when isocyanate-functional materials are involved. Of course, and after the isocyanate functionality has been consumed, other solvents and materials may be incorporated into the lacquer composition without regard for isocyanate inertness since the isocyanate functionality is no longer present in significant amount.

Among the organic solvents which may be used are urethane grade ketones, such as methyl ethyl ketone or acetone, and esters such as ethyl acetate, butyl acetate, or 2-ethoxy ethanol acetate.

Any diisocyanate may be used to adduct with the monofunctional ethylenic compound, aromatic diisocyanates such as toluene diisocyanates being particularly available, but any organic compound containing two isocyanate groups can be used. The class of organic diisocyanates is well known.

The lacquer solutions are applied in conventional fashion using, for example, air spray or electrostatic spray and the wet applied coating is then dried by solvent evaporation. Air drying or force drying with warm air or exposure to a low temperature, e.g., a steam heated oven, may be used. Since the resins are normally solid resins, the mere evaporation of solvent leaves behind a film of thermoplastic resin which is solvent-soluble, and easily abradable permitting repair, rubbing, buffing, and the like. One or more coats may be applied, one atop the other, with each coat worked before overcoating, before ultraviolet light exposure is used to cure all of the coatings together.

After the film is finished, it is then exposed to ultraviolet light, e.g., from a mercury vapor arc lamp. An exposure of only a few seconds causes the film to begin to possess acetone insolubility and provides a film which is toughened and more difficult to rub. Sometimes a longer exposure up to about 10 minutes is required, but a one minute exposure is usually more than adequate since considerable insolubility and toughness are acquired in 30 seconds. It will be appreciated that these exposure times will vary with the radiation source and intensity and are here presented based on experience with a 550 watt Hanovia Model 673A medium pressure mercury vapor arc held at a distance of 11 inches from the lacquered substrate. This lamp was used because it was a reasonably strong source of ultraviolet light. Other sources of ultraviolet light are equally suitable, especially those which minimize the heat output of the lamp such as fluorescent mercury tubes emitting ultraviolet light.

Any known plasticizer for the resin used in the lacquer is broadly useful to soften the film when the resin is more brittle than desired. However, and to maximize the insolubility and strength which are achieved, it is desired to use an alpha, beta-ethylenically unsaturated plasticizer to chemically crosslink with the unsaturated lacquer grade resins used herein.

Oils are desirable plasticizers, and unsaturated oils such as soya bean oil, linseed oil or the like can be peroxidized, as with peracetic acid, to introduce epoxy functionality. Such oils are well known as epoxidized oils. In this invention, the epoxidized oil is adducted with an alpha, beta-monoethylenic carboxylic acid to form an unsaturated hydroxy ester with the oil. These form excellent plasticizers and the unsaturation introduced by such acids as acrylic acid is particularly adapted to cross-link with the same type of unsaturation introduced into the lacquer grade resin when the dried films are exposed to ultraviolet radiation.

Another preferred plasticizer is a trihydric tripolycaprolactone derivative of a trihydric alcohol such as glycerin or trimethylol propane which has been adducted with three molar proportions of a toluene diisocyanate-hydroxyethyl acrylate monoisocyanate adduct. A preferred trihydric tripolycaprolactone has the formula:

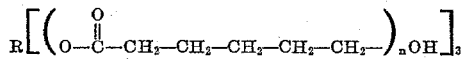

where R is the residue of glycerin and $n$ is 2. This product is referred to as Tripolycaprolactone Triol A and is used in the accompanying examples. A corresponding commercial product is available from Union Carbide Corp. under the trade identification PCP 0300.

While the preferred substrate is wood, other substrates can be quite important. Thus, the lacquers of this invention are quite desirable for the coating of teeth to protect them from cavities. It has been established that the sealing of the biting surface will prevent decay-producing organisms from entering the teeth to produce decay. This requires cure to a hard and tough resin. Previously, a radiation curing liquid at 100% solids was used, but the solvent systems herein penetrate crevices better and the dried films can be more easily ground to better conform with the mating surfaces of the teeth and then cured by ultraviolet exposure.

This utility is illustrated by the reaction of a normally solid diglycidyl ether of bisphenol A having a molecular weight of about 1000 (Shell product Epon 1004 can be used) with a stoichiometric proportion of acrylic acid (based on epoxy). These reactants are dissolved in acetone, to provide a solution having a solids content of 70% and 0.1% of triethyl amine catalyst is added and the solution cooked at 125° C. (pressure used to maintain the liquid state) until the acidity of the acrylic acid has been consumed (acid value below 10). 0.5% benzophenone is then added to sensitize the resin and provide a solution which can be coated on the mating surface of teeth, dried, abraded to desire shape, and then cured by ultraviolet exposure.

The invention is illustrated as follows.

EXAMPLE 1

| | Parts by weight |
|---|---|
| ¼ second nitrocellulose (Hercules RS) | 100 |
| Toluol | 165 |
| 2-ethoxy ethyl acetate (urethane grade) | 130 |
| Ethyl acetate (urethane grade) | 140 |
| Hydroxy ethyl acrylate-toluene diisocyanate adduct (1.1:1 mol ratio) | 32 |
| Total solids | 132 |
| Solvent | 432 |

The above are simply mixed together in order to dissolve the resins in the solvents. The final product contains about 23% non-volatile solids.

EXAMPLE 2

| | Grams |
|---|---|
| Benzophenone | 0.25 |
| Solution of Example 1 | 20.0 |
| Plasticizer—Tripolycaprolactone Triol A adducted with three molar proportions of a toluene dissocyanate hydroxyethyl acrylate monoisocyanate adduct (1:1 mol ratio) | 2.0 |
| Butyl acetate | 15.0 |

The above are simply mixed together to form a solution which is applied as a coating using air spray to a birch veneer panel. The applied coating is air dried and then buffed with sand paper to smooth the same. Two additional coatings are applied in the same way and force dried for 5 minutes at 160° F. One section of the coated panel is then rubbed with 600 grit sand paper wet with mineral spirits and then polished with a conventional rubbing compound. The other portion of the panel was not mechanically worked. Then, a portion of the panel covering both the rubbed and unrubbed sections was covered with aluminum and the panel was irradiated for 120 seconds at a distance of 11 inches from a 550 watt Hanovia medium pressure mercury vapor arc.

The ultraviolet exposure greatly improved the solvent resistance of the coating since the unexposed portion was completely soluble in acetone whereas the exposed portion showed only slight sensitivity to acetone. However, the rubbed section of the panel exhibited great luster and uniformity whereas the unrubbed section was still rough and it was now so highly cured as not to be easily polishable.

The invention is defined in the claims which follow.

We claim:

1. A method of providing a cured lacquer film on a substrate comprising coating the substrate with an organic solvent having dissolved therein a normally solid radiation-curable lacquer resin system, evaporating said solvent to form a solvent-soluble thermoplastic resinous film on said substrate, physically working said film to modify the same and then irradiating said modified thermoplastic film to increase the solvent resistance and physical toughness thereof.

2. A method as recited in claim 1 in which said resin system comprises a nitrocellulose resin.

3. A method as recited in claim 1 in which the radiation used to increase the solvent resistance of said film is selected from gamma radiation, beta radiation and ultraviolet light radiation.

4. A method as recited in claim 1 in which said substrate is wood and said physical working comprises sanding.

5. A method of providing a cured lacquer film on a substrate comprising coating the substrate with an organic solvent having dissolved therein a normally solid radiation-curable resin system comprising the addition reaction product of an hydroxyl functional lacquer resin and an alpha, beta-ethylenically unsaturated monoisocyanate, and a sensitizer to render said resin system sensitive to ultraviolet light, evaporating said solvent to form a solvent-soluble thermoplastic resinous film on said substrate, physically working said film to repair, rub or buff the same and then irradiating said thermoplastic film with ultraviolet light to increase the solvent resistance and physical toughness thereof.

6. A method as recited in claim 5 in which said hydroxy functional resin is selected from nitrocellulose and hydroxy ethyl cellulose.

7. A method as recited in claim 5 in which said monoisocyanate is the addition reaction product of one mole of hydroxy ethyl acrylate with one mole of organic diisocyanate.

8. A method as recited in claim 6 in which said resin system includes an alpha,beta-ethylenically unsaturated plasticizer for said hydroxy functional resin.

9. A method as recited in claim 8 in which said plasticizer is an epoxidized oil adducted with a monoethylenic carboxylic acid.

10. A method as recited in claim 8 in which said plasticizer is a trihydric tripolycaprolactone derivative of a trihydric alcohol which has been adducted with three molar proportions of a toluene diisocyanate-hydroxyethyl acrylate monoisocyanate adduct.

11. A method as recited in claim 5 in which said monoisocyanate is the addition reaction product of 1 mol of an hydroxy acrylate with 1 mol of organic diisocyanate and said monoisocyanate is used in an amount to react with at least 5% of the hydroxy groups of said hydroxy functional resin.

12. An ultraviolet light curable lacquer comprising an organic solvent having dissolved therein a normally solid radiation-curable resin system comprising the addition reaction product of an hydroxy functional lacquer resin selected from nitrocellulose and hydroxyethyl cellulose and an alpha,beta-ethylenically unsaturated monoisocyanate, and a sensitizer to render said resin system sensitive to ultraviolet light.

13. A lacquer as recited in claim 12 in which said unsaturated monoisocyanate is the addition reaction product of approximately equimolar proportions of organic diisocyanate and hydroxy ethyl acrylate and said resin system includes an alpha,beta-ethylenically unsaturated plasticizer for said hydroxy functional resin.

References Cited

UNITED STATES PATENTS

| | | | |
|---|---|---|---|
| 1,818,073 | 8/1931 | Long | 117—93.31 |
| 3,441,543 | 4/1969 | Heilman | 117—148 |
| 3,511,687 | 5/1970 | Keyl et al. | 117—93.31 |
| 3,219,473 | 11/1965 | Dimond | 117—64 R |
| 3,554,886 | 1/1971 | Colomb et al. | 117—93.31 |

OTHER REFERENCES

Schmeck "New York Times," pp. 1 and 31, Feb. 8, 1970.

ALFRED L. LEAVITT, Primary Examiner

J. H. NEWSOME, Assistant Examiner

U.S. Cl. X.R.

117—64 R, 93.31, 148, 161 KP, DIG. 7; 204—159.12; 260—17 A